United States Patent Office 3,258,837
Patented July 5, 1966

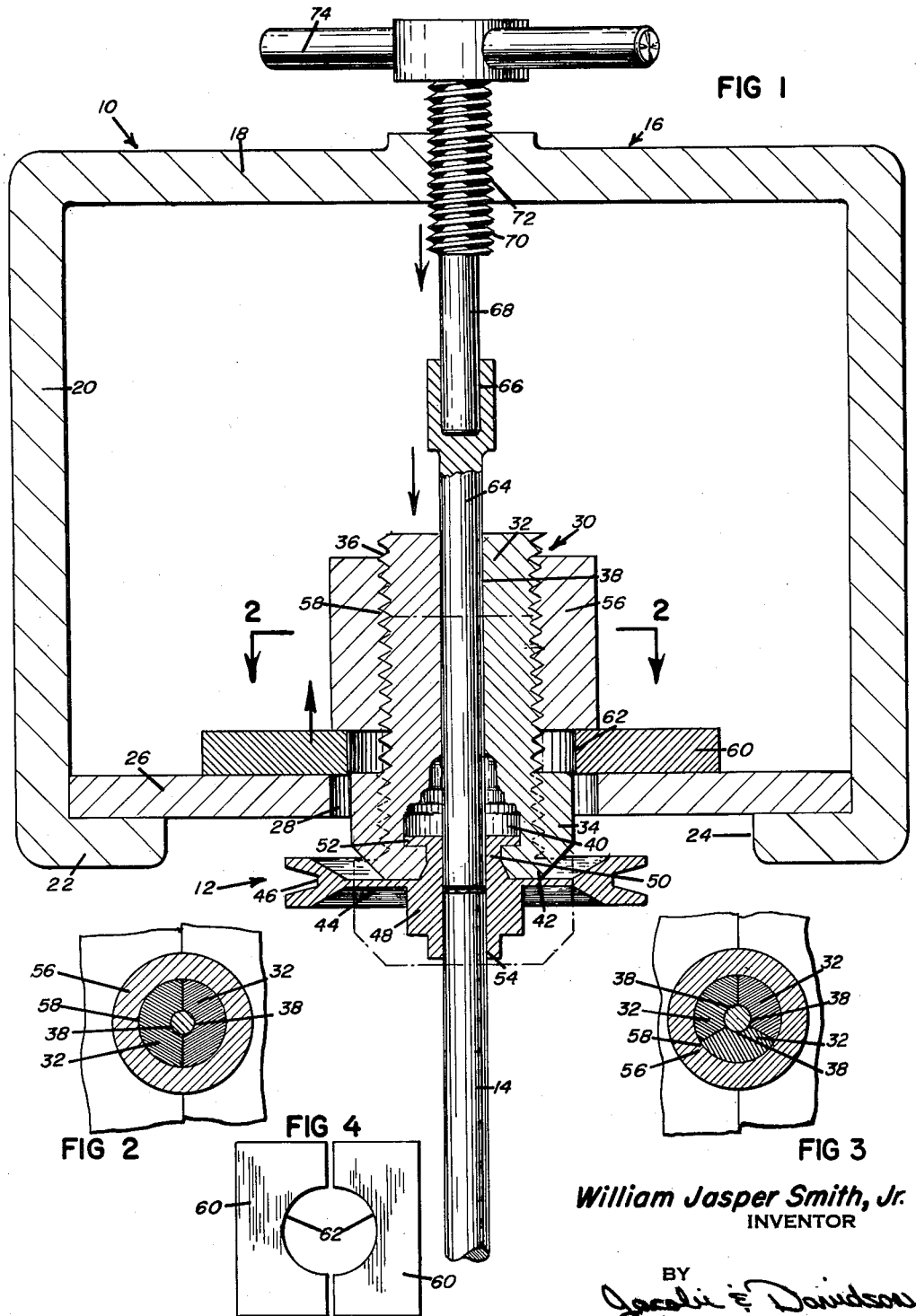

3,258,837
MEANS FOR REMOVING SHAFT COLLARS
William Jasper Smith, Jr., 4211 20th Ave., Langdale, Ala.
Filed Apr. 3, 1964, Ser. No. 357,233
6 Claims. (Cl. 29—259)

This invention relates to a means for removing shaft collars and more particularly it relates to a removable device for axially removing a pulley, bearing, pinion, sprocket or other similar element from an elongated shaft. The term "collar" as used herein is intended to be a generic term defining any annular element which is engaged upon a shaft.

Such collars are customarily frictionally engaged upon their associated shafts by shrink fitting or other suitable means which assures integrity between the shaft and the collar. However, it is sometimes necessary to repair or replace such a collar and to accomplish this, a suitable means must be provided for stripping or pulling the collar axially of the shaft. In accomplishing such collar removal, it is imperative that the shaft not be damaged or distorted and it is often desirable that the collar be removed in an undamaged condition. Such removal, without damage to the parts, is difficult to accomplish even under the best of circumstances, and if a piece of delicate equipment is affixed to the shaft, the difficulties become magnified.

Turning to a specific instance, it is often desirable to remove a pulley or bearing from the shaft of an automotive generator or alternator. In most instances, the pulley only needs regrooving or the bearing reconditioning so it is preferable to remove such an element from the shaft without damaging either it or the shaft. However, if one attempts to remove the pulley or bearing by driving a wedge between it and the shaft, or by stripping the edge of the pulley with a chisel or other sharp implement, the result is almost certain to gouge the shaft, or distort the inner surface of the pulley or bearing, or both. Similarly, if one attempts such a removal by holding one part in a vise and moving the other part relatively to it, that part gripped by the vise jaws is almost certain to be distorted. For instance, if the alternator shaft were held between the vise jaws so that the pulley could be driven axially along the shaft and over its end, the jaws of the vise would almost certainly bite into the shaft and cause flats or distortions which would render the shaft out of round so that a new pulley could not be applied to the shaft without first reconditioning the distorted portions thereon. Likewise, if the vise jaws gripped the outside of the pulley so that the shaft could be driven through the pulley, not only would the vise jaws flatten or distort the outer edges of the pulley but also the striking on the end of the shaft would flatten or enlarge it to such a degree that a new pulley could not fit over it. There is also the additional possibility that, if the shaft could successfully be driven through the vise gripped pulley, the entire alternator would fall to the floor, thus possibly cracking its housing and seriously damaging the entire unit.

It will be obvious from the foregoing matter that crude manual methods are not satisfactory for removing a frictionally engaged collar from a shaft. Because of this, and because of the obvious need for facilitating such removal, there have in the past been certain attempts to devise tools or assemblies for accomplishing such removal. Generally, however, such tools have involved the use of a plurality of fingers which are separately screwed into engagement with the periphery of the collar after which a suitable means pushes upon the end of the shaft to remove the shaft relatively to the finger-retained collar and thereby remove the collar. The use of such tools was generally slow and difficult and the fingers did not always provide the desired gripping strength on the collar.

With the foregoing in mind, it is, therefore, a primary object of the present invention to overcome the difficulties and deficiencies encountered in the past and to provide a suitable means for removing collars from shafts.

Another primary object of the present invention is to provide a device which can satisfactorily move a collar and a shaft on which the collar is frictionally retained, relatively to one another to thereby axially strip the collar from the shaft.

Further general, though equally significant, objects of the present invention include the provision of a collar stripping means which: (a) accommodates various sized collars and shafts; (b) can be easily operated to produce a powerful pulling force; (c) is compact, durable, inexpensive and easy to operate; and (d) separates the collar from the shaft without damage to either of the parts.

Other objects, advantages and salient features of the present invention will become apparent from the following detailed description, which, taken in connection with the annexed drawing, discloses a preferred embodiment thereof.

Referring to the drawing:
FIGURE 1 is a longitudinal sectional view through a means or device in accordance with the principles of the present invention;
FIGURE 2 is a transverse sectional view taken substantially along line 2—2 of FIGURE 1;
FIGURE 3 is a transverse sectional view, similar to FIGURE 2, but showing a slightly modified form of device; and
FIGURE 4 is a top plan view of one of the elements utilized in the device shown in FIGURE 1.

Referring now to FIGURE 1, there is provided a means or device generally designated 10 which can remove various forms of collars from shafts, but which is illustrated removing a pulley generally designated 12 from a shaft 14 which emanates, for example, from an automobile generator or alternator, not shown. The device includes a housing or frame generally designated 16 and having a top wall 18, side walls 20, and a bottom wall 22 which extends radially inward a short distance from the side walls 20 and terminates in an aperture 24. Within the housing 16, a generally flat plate 26 rests upon the inner surface of the bottom wall 22 and is provided with a central aperture 28 which communicates coaxially with the aperture 24. If desired, the plate 26 could be eliminated by extending the bottom wall 22 radially inward for a greater distance so the aperture 24 would be approximately the size of the plate aperture 28.

Disposed within the apertures 24 and 28 is a set of jaw members generally designated 30 which is adapted to engage a portion of the pulley 12. The jaw members, as shown in FIGURES 1 and 2, comprise a two-piece split cylindrical jaw with each piece having a shank portion 32 and an enlarged head portion 34 at one end thereof. The shank portion is provided with exterior threads 36 extending along the length thereof and terminating adjacent the head portion 34. Each shank portion is provided internally with a portion 38 of a cylindrical bore so that when the jaw members are assembled, as shown in FIGURES 2 and 3, the bore portions 38 mate compatibly to form a uniform cylindrical bore. In the device of FIGURE 2, which is designed for removing pulleys, two jaw members are utilized so each has an internal bore portion 38 which forms one-half the finished bore. In the device of FIGURE 3, which is designed for removing bearings, three jaw members are utilized so each has an internal bore portion 38 which forms one-third of the finished bore.

Each bore portion 38 extends substantially the length of the shank portion 32 and merges into a shaped recess portion 40 formed in the head portion 34. When the jaw members 30 are assembled, the recess portions 40 mate compatibly with one another to form a continuous, generally circular recess. The lower or terminal end of the head portion 34 has a radially inwardly extending wall 42 which extends partially below each recess portion 40 and is adapted to receive and mate with a part of the pulley 12.

The pulley 12 includes a sheave portion 44 having a groove 46 at its peripheral rim, a first hub portion 48 extending centrally from one side of the sheave portion, and a second hub portion 50 extending centrally from the other side of the sheave portion. A flange 52 extends outward from the end of the hub portion 50. The head portion wall 42 fits between the flange 52 and the sheave portion 44 and when all of the jaw members 30 are assembled, the flange 52 is disposed within the recess and resting upon the inner surface of the wall 42. A central aperture 54 extends through both hub portions and the sheave portion of the pulley 12, and the shaft 14 normally extends through this aperture 54 and is frictionally engaged therein.

The jaw members 30 are assembled and retained as a single unit which clamps the pulley 12 by means of a collar or nut 56 having a threaded internal bore 58 of a proper thread size and diameter to engage the exterior threads 36 on the jaw shank portions 32 to assemble such portions together as shown in FIGURES 2 and 3. A bearing plate in the form of a split plate 60 formed of two half sections, each with one-half an aperture 62 formed therein, is disposed between the nut 56 and the plate 26. The diameter of the aperture 62 is smaller than the exterior dimensions of the nut 56 so that, when the device is assembled, the lower end of the nut 56 rests upon and bears against those portions of the plate 60 marginal to the aperture 62.

A push rod 64 is disposed within the central bore of the jaw members 30, and while the diameter of the rod 64 is nearly the same as that of the bore formed by the sections 38, it is slightly smaller to permit the rod to be pushed through the bore when force is applied to its end. Similarly, the diameter of the rod 64 is slightly smaller than that of the pulley central aperture 54, so the rod can be pushed through that aperture to remove the shaft 14 therefrom. To provide a means for applying force to move or push the rod 64, the upper end of the rod is provided with a recess 66 designed to accommodate the lower end of a stem 68 having a threaded side wall 70 which passes through a compatibly threaded aperture 72 in the top wall 18 of the housing 16. At the upper end of the stem 68 which extends exteriorly of the housing 16, a manually engageable handle 74 is provided.

To operate the device 10 and thereby remove the pulley 12 from the shaft 14, the handle 74 is manually turned to thread the stem 68 further into the housing 16. As the stem threads inward, or downward as shown in FIGURE 1, it pushes the rod 64 and slides it downward through the bore 38 between the jaw members 30. After the lower end of the rod 64 passes through the recess 40, it enters the pulley central aperture 54 which is aligned beneath the bore formed by the sections 38. The shaft 14 is tightly engaged within the central aperture 54 and the end of the rod 64 abuts against the end of the shaft 14. Further turning of the handle 74 applies a very powerful force against the end of the shaft 14 and causes it to move axially downward and out of the central aperture 54, thereby separating the shaft and the pulley.

Within the device 10, the force balance is evenly distributed. As the handle 74 drives the stem and rod downward, the pulley 12 tends to move downward and thus applies a downward force to the jaws 30 via the flange 52. This downward force on the jaws is transmitted to the nut 56 affixed thereto. However, as the nut tends to move downward, it is opposed by the split plate 60 which operatively rests upon the housing lower wall 22 and which thereby applies an equal and opposite upward force. Thus, the point of force is actually between the nut 56 and the plate 60 and this force point is equally spread about the entire exterior of the jaw members 30. Also, the area of force is kept quite small by providing contact only between the outer edges of the lower face of the nut 56 and those plate edges just marginal to the aperture 62.

To assure that the same mating threads 36 and 58 on the jaw members will not continuously receive the applied forces, the nut 56 can be moved upward or downward along the shank portions 32 on the jaw members 30 to thus distribute the forces evenly along the threads. In FIGURE 1, the dotted lines indicate the position of the jaw members 30 if the nut 56 is threaded upward for a short distance. It will be obvious that different sizes of pulleys or bearings can be removed from many different sizes of shafts merely by changing the jaw members 30 and their assembly nut 56. The central bore formed by the sections 38 can remain the same size so that the same push rod 64 can be employed, or, if necessary or desirable, the size of the bore can be enlarged or diminished and the push rod diameter can be varied accordingly.

After reading the foregoing detailed description, it should be apparent that the objects set forth at the outset of this specification have been successfully achieved.

What is claimed is:

1. Means for removing a collar from a shaft comprising:
   a plurality of jaw members which are assembled to engage at least a portion of the collar;
   a push rod slidably disposed between said jaw members;
   means for supporting said assembled jaw members and preventing them from movement axially of said shaft;
   means for sliding said push rod through said jaw members and into engagement with the end of said shaft to push said shaft axially out of said collar;
     said jaw members being compatibly assemblable to form a shank portion having an internal bore to accommodate said push rod and also to form a head portion integral with said shank portion and having a recess therein for receiving at least a portion of said collar;
     said shank portion being externally threaded; and,
     nut means with a compatibly threaded internal bore being engaged over said shank portion to maintain said jaws in assembled relation.

2. Means as defined in claim 1 wherein the means for supporting said assembled jaw members includes a fixed plate against which said nut means abuts.

3. A device for axially removing from a shaft, a pulley, or other like collar frictionally engaged upon said shaft, said device comprising:
   a housing having an enlarged opening therein aligned over said pulley and said shaft;
   a manually engageable handle having at least a partially threaded depending stem;
   said stem being threadably mounted in said housing in alignment over said enlarged opening;
   a plurality of jaw members adapted to be disposed within said housing opening;
   said jaw members each having an enlarged head portion and an externally threaded shank portion;
   said jaw members being juxtaposed to one another and assembled by an internally threaded nut which is applied over said shank portions;
   said assembled jaw members having an internal bore formed between said shank portions and extending in axial alignment with said shaft and also having a recess formed between said head portions at one end of said internal bore;

said recess being shaped to receive and retain at least a portion of said pulley;

a push rod slidably mounted within said internal bore and having one end coupled to said stem;

a bearing plate means disposed beneath said nut to support said assembled jaw members and prevent them from moving axially of said shaft;

said device being operable by manually turning said handle to cause said stem to drive said push rod through said internal bore and said recess to engage an end of said shaft and to push it, thereby moving said shaft axially out of said pulley.

4. A device as defined in claim 3 wherein such jaw member head portions have inwardly extending end wall portions which, when said jaw members are assembled, extend beneath said recess to retain a portion of said pulley therein.

5. A device as denfied in claim 3 wherein said bearing plate means includes a split plate being assemblable to form an aperture larger than said assembled shank portions but smaller than said assembly nut whereby said nut rests on the split plate portion marginal to its aperture.

6. A device as defined in claim 5 wherein said split plate is supported by said housing with said split plate aperture in axial alignment with said housing opening.

References Cited by the Examiner
UNITED STATES PATENTS

| | | | |
|---|---|---|---|
| 1,153,070 | 9/1915 | Hammar | 29—259 |
| 1,171,590 | 2/1916 | Campbell | 29—263 |
| 1,426,835 | 8/1922 | Mohrman | 29—259 |
| 1,482,694 | 2/1924 | Neill | 29—261 |
| 1,662,538 | 3/1928 | Richmond et al. | 29—270 |
| 2,956,336 | 10/1960 | Peterson | 29—261 |
| 3,065,528 | 11/1962 | Marshall | 29—249 |
| 3,111,752 | 11/1963 | Simmons | 29—252 |

WILLIAM FELDMAN, *Primary Examiner.*

MYRON C. KRUSE, *Examiner.*